H. L. JOHNSTON.
MEAT CHOPPER AND THE LIKE.
APPLICATION FILED FEB. 21, 1916.
1,264,081.
Patented Apr. 23, 1918.
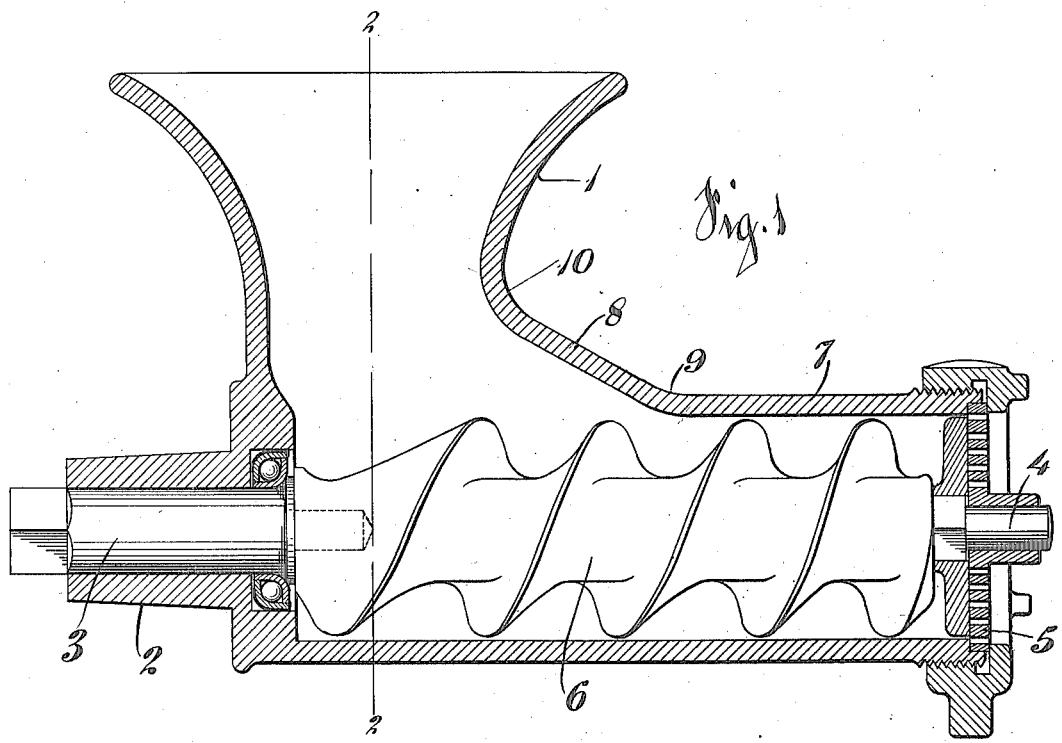
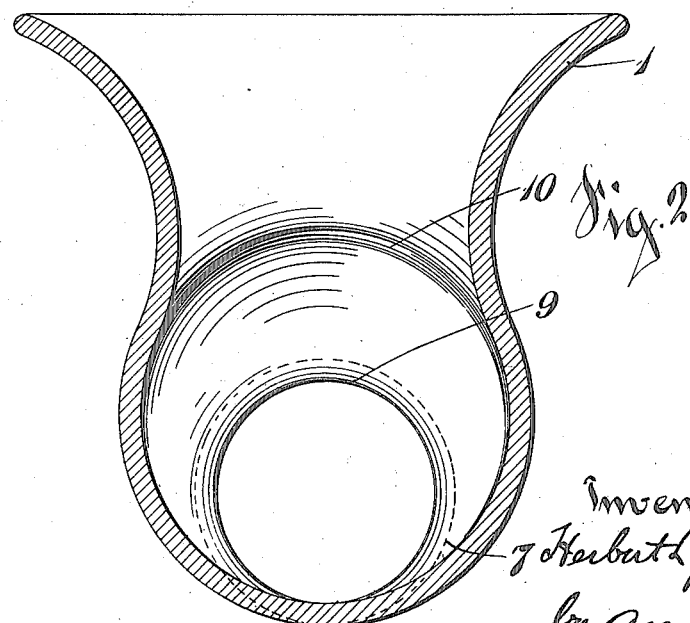

UNITED STATES PATENT OFFICE.

HERBERT L. JOHNSTON, OF TROY, OHIO, ASSIGNOR TO THE HOBART MANUFACTURING COMPANY, OF TROY, OHIO, A CORPORATION OF OHIO.

MEAT-CHOPPER AND THE LIKE.

1,264,081.

Specification of Letters Patent.

Patented Apr. 23, 1918.

Application filed February 21, 1916. Serial No. 79,482.

*To all whom it may concern:*

Be it known that I, HERBERT L. JOHNSTON, a citizen of the United States, and a resident of the city of Troy, in the county of Miami and State of Ohio, have invented certain new and useful Improvements in Meat-Choppers and the like, of which the following is a full, clear, and exact description, reference being had to the accompanying drawing, forming part of this specification.

My invention relates to meat choppers particularly of the type that are driven at fairly high speeds by power machinery and are of the type wherein a feed worm lies within a cylinder and having a hopper inlet to the cylinder. Ordinarily the walls of the cylinder meet the walls of the hopper at approximately ninety degrees and the worm is made a close fit within the cylinder throughout its entire length. The speed of operation with power machinery, therefore, results in failure to carry into the cylinder all of the meats engaged by the worm.

It is the object of my invention to provide a chopper in which the cylinder is gradually enlarged to the line of intersection between the cylinder and the hopper, thus making the angle between the cylinder walls and the hopper walls to be more than ninety degrees, and enlarging and graduating the inlet of the hopper into the cylinder.

It is customary to chop meats through such a machine twice. When meats have been chopped once and are again fed through, such meats become sticky and are much more difficult to fed than is the case in the first time through. Enlarging the inlet from the hopper into the cylinder is therefore a distinct advantage. These machines are also used largely for stuffing sausages into casings, in which event water is frequently added to the meat, making it more or less liquid in consistency and stickiness and aggravating the feeding conditions. Besides being used for the stuffing of sausage, such machines are used for forcing other products into containers, among which products are peanut butter, soap, mustard, lard, butter, and other semi-liquid and pastry products. By reason of my construction such products are more easily and more rapidly admitted to both the worm and the cylinder, and this is accomplished by that certain construction and arrangement of parts to be hereinafter more specifically pointed out and claimed.

In the drawing,

Figure 1 is a central longitudinal section of the machine.

Fig. 2 is a vertical section thereof, taken on the line 2, 2, of Fig. 1, with the chopper and worm removed.

The casing has the hopper 1 of the usual shape. At the base of the hopper at one side is the usual journal 2 for the worm shaft 3. The worm has also a shaft 4 at the other end which is journaled in the chopper plate 5 which is secured in the usual manner in the machine.

The worm 6 has parallel and equal sized convolutions, although any type of worm would be satisfactory. The cylinder 7 is of about the size of the worm toward the chopper plate end, but it begins to expand at line 9 and continues to expand until it intersects the hopper at 10. This expansion may be made all around the cylinder or it may be confined to the upper portion of the cylinder only, or, as is shown in my drawing, the cylinder may be expanded all around except at the bottom. This expansion slopes gradually from the normal diameter of the cylinder.

The result of this expansion at the point of entrance of the worm is that the meats will be fed rapidly to the chopper plate. If a sharp wall from the hopper came down at the point of entrance of the worm, then the meats would accumulate so rapidly on quick feeding that they could not get into the cylinder. In the device as above described, however, the meats will easily feed by the open portion of the hopper and in the sloping surface of the expanded cylinder entrance there is presented a wall against which the worm can work to compress the meats and feed them onward, rather than bouncing them up and down in the hopper.

I do not wish to be limited in the claims that follow to the exact structure described in the foregoing specification, as the description refers but to the preferred form of my invention; on the contrary, I wish to be entitled to the full scope of the doctrine of equivalents in the construction of my claims. Also I do not wish to be limited in my claims because of my failure at this time to appreciate the full usefulness of my invention, as I intend it to be used in the future in any manner that may turn out to be economical and convenient, and that mere mechanical changes necessary to adapt it to future uses be fully included in the scope of my invention.

Having thus described my invention, what I claim as new and desire to secure by Letters Patent, is:—

1. In a device of the character described, the combination with a cylinder member, a hopper at one end of the cylinder member, a worm in the cylinder and hopper members, said cylinder being at the delivery end thereof of approximately the diameter of the worm convolutions, and of a length to include one or more of said convolutions and with the cylinder opening at the entrance from the hopper being expanded at least half way around its shell to form a gradual constriction of said cylinder over the worm, as the delivery end is approached, for the purpose described.

2. In a device of the character described, the combination with a cylinder member, a hopper at one end of the cylinder member, a worm in the cylinder and hopper members, said cylinder being at the delivery end thereof of approximately the diameter of the worm convolutions, and of a length to include one or more of said convolutions and with the cylinder opening at the entrance from the hopper being expanded at least half way around its shell on a circular line eccentric to the axis of the said cylinder, to form a gradual constriction of said cylinder over the worm, as the delivery end is approached, for the purpose described.

3. In a meat chopper or the like, in combination with a hopper, a worm and a worm cylinder of constant diameter, said cylinder having an expanded portion at the point of entrance of the worm from the hopper into said cylinder, said expanded portion being curved and larger at the entrance from the hopper and sloping away to the main bore of the cylinder.

HERBERT L. JOHNSTON.